Feb. 19, 1935.  W. S. DAVIDSON  1,991,597
POWER STEERING GEAR
Filed Sept. 1, 1932   2 Sheets-Sheet 1
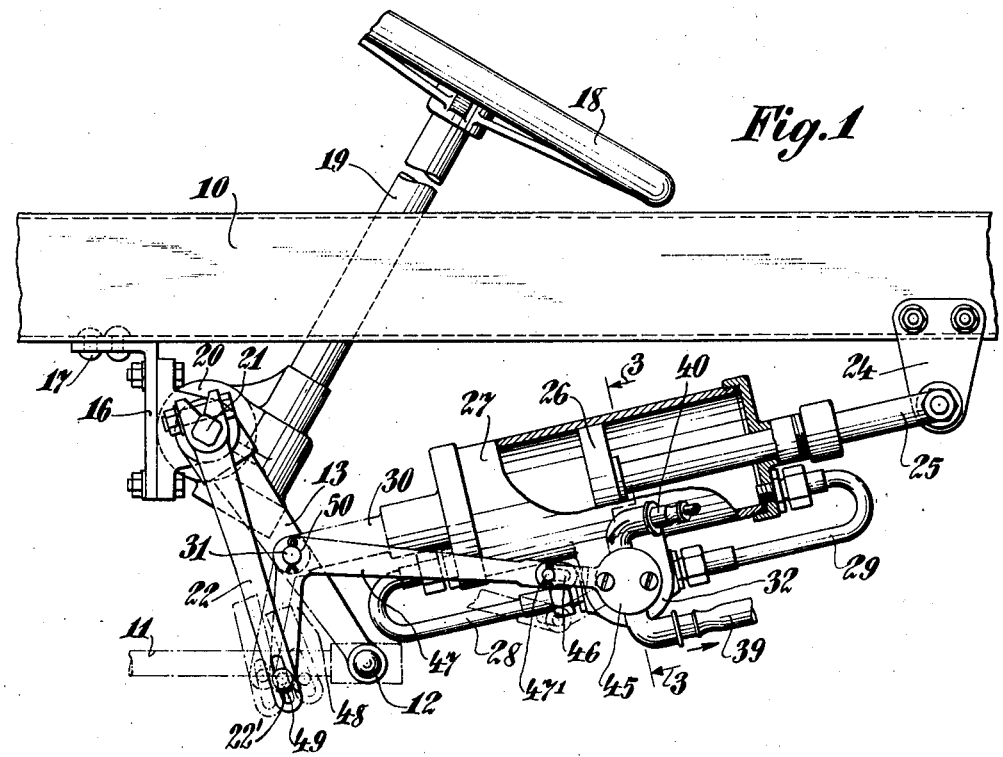
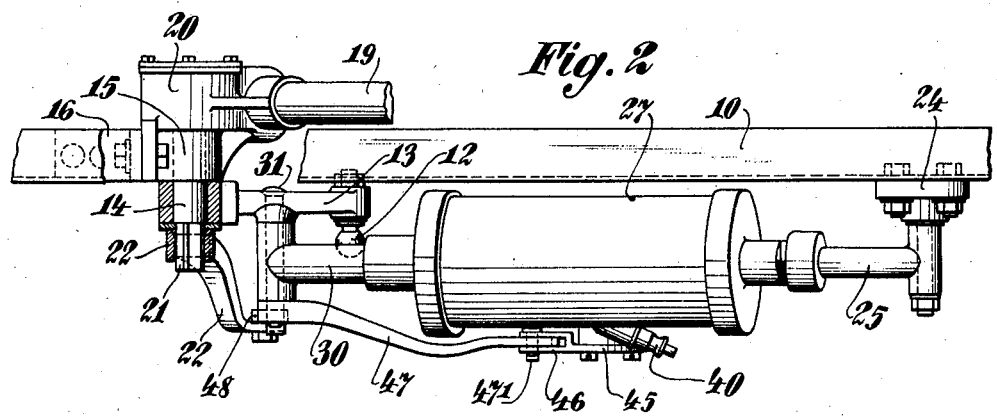
INVENTOR
Walter S. Davidson,
BY
Redding, Greeley, O'Shea & Campbell
HIS ATTORNEYS Feb. 19, 1935. W. S. DAVIDSON 1,991,597
POWER STEERING GEAR
Filed Sept. 1, 1932  2 Sheets-Sheet 2

INVENTOR
Walter S. Davidson,
BY
Redding, Greeley, O'Shea & Campbell
HIS ATTORNEYS Patented Feb. 19, 1935

1,991,597

UNITED STATES PATENT OFFICE 1,991,597

POWER STEERING GEAR

Walter S. Davidson, Newport, R. I.

Application September 1, 1932, Serial No. 631,331

1 Claim. (Cl. 121—41)

The present invention relates to steering mechanisms and embodies, more specifically, an improved mechanism by means of which a source of power is utilized to effect the movement of a steering mechanism, manual means being provided for controlling the application of power to the mechanism.

A number of mechanisms have been provided which utilize a source of fluid pressure available upon a vehicle for actuating the vehicle steering mechanism, these devices being of rather complicated nature and costly to manufacture and assemble. In order that a source of fluid pressure available upon a vehicle frame may be utilized to actuate effectively, the steering mechanism of a motor vehicle, the present invention has been designed. An object thereof is to provide a simple and efficient mechanism by means of which a source of fluid pressure is utilized to effect the steering movement of a steering mechanism, a manual control mechanism being provided to control the application of fluid pressure to the steering mechanism.

A further object of the invention is to provide a simple and effective device for controlling a power steering mechanism in such fashion that any predetermined degree of motion of the steering mechanism may be effected by the power mechanism with entire accuracy and dispatch.

A further object of the invention is to provide a power steering mechanism having the characteristics noted above and being of such further character that it may be readily applied to the vehicle constructions now available without requiring substantial alteration thereof.

Further objects, not specifically enumerated above, will be apparent as the invention is described in further detail in connection with the accompanying drawings, wherein:

Figure 1 is a view in side elevation, partly broken away and in section, showing a power steering mechanism constructed in accordance with the present invention.

Figure 2 is a plan view of the construction shown in Figure 1.

Figure 3:
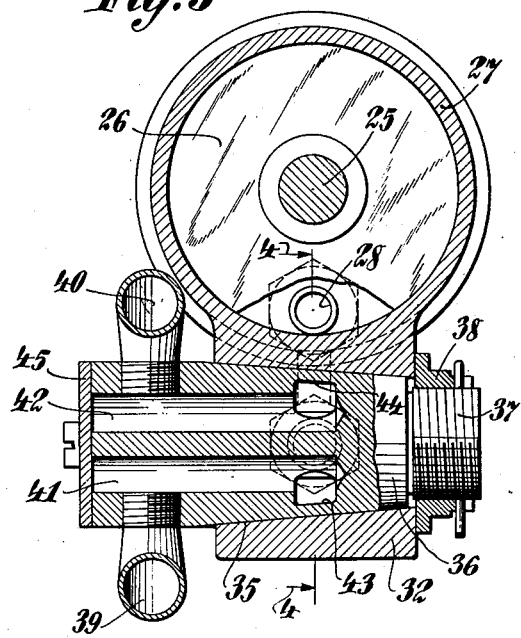
Figure 3 is a view in section, taken on line 3—3 of Figure 1, and looking in the direction of the arrows.

With reference to the accompanying drawings, a vehicle frame is illustrated at 10 and is provided with dirigible wheels and steering mechanism in accordance with standard automotive practice. Inasmuch as these elements constitute no part of the present invention, a specific description thereof is believed unnecessary herein and it will suffice to illustrate the drag link of a steering mechanism at 11. This drag link is connected to a knuckle 12 which is formed upon the end of a steering lever 13 which is journaled upon a shaft 14. Shaft 14 is journaled within a bearing member 15 which may be secured to a bracket 16 and mounted upon the frame 10 at 17. The usual steering wheel 18 and steering column 19 is provided for turning shaft 14, the particular type of steering mechanism utilized for this purpose being of no consequence. Accordingly, the particular form of mechanism within housing 20 has not been shown inasmuch as it may be a cam and lever; worm and sector, or other standard form of mechanism.

The foregoing mechanism provides a means for turning shaft 14 in one direction or another within the bearing 15 and, in order that this motion may be utilized to effect the control of a power mechanism to be described hereinafter, the end of shaft 14 is squared as at 21. Upon the end of squared shaft 21, a control lever 22 is secured.

Pivoted upon a bracket 24 which is secured to the frame 10 is a piston shaft 25 upon the end of which a piston 26 is mounted. This piston is adapted to have a cylinder 27 slide thereover into which cylinder fluid may be directed by means of pipes 28 and 29. The cylinder 27 is formed with an extension 30 which is journaled upon a shaft 31, mounted upon lever 13. By means of this construction, the application of fluid pressure upon either side of piston 26 within cylinder 27 will cause the steering arm 13 to be moved in a corresponding direction. The application of such pressure is controlled by means of a valve mechanism shown in detail in Figures 3, 4 and 5 and including a housing 32 which may be formed on or secured to the cylinder 27. This housing is formed with ports 33 and 34 to which are connected pipes 28 and 29, respectively. A conical valve chamber 35 is formed within the housing 32 and receives a conical valve member 36 which is formed with a threaded extension 37. A nut 38 may be threaded over the extension 37 to secure the valve member 36 in position and fluid is introduced into the valve member through a connection 40 which is adapted to be connected to a flexible conduit which is connected to a suitable source of fluid pressure. A connection 39 is adapted to be connected to a flexible conduit to carry fluid away from the valve member 36 and the connections 39 and 40 communicate with passages 41 and 42, respectively, in the valve member 36.

The passage 41 communicates with openings 43 while passage 42 communicates with openings 44 in the valve member, these openings being aligned with ports 33 and 34 in order that rotation of the valve member may bring the openings and ports into registry.

Rotation of the valve member 36 is effected by means of a plate 45 which is formed with a bifurcated extension 46. A bell crank lever formed with an arm 47 is connected to the extension 46 by means of a pin and slot connection 47'. Another arm 48 of the bell crank lever is connected to the arm 22 through a pin and slot connection 49 and the bell crank lever is pivoted at 50 upon the shaft 31.

The operation of the mechanism will be apparent from the foregoing and it will be seen that actuation of the steering wheel 18 will cause swinging motion of the lever 22 in either direction. This motion is transmitted through the bell crank lever to the valve plate 45 and rotates the valve member 36 to bring openings 43 and 44 into registry with the ports 33 and 34 to introduce fluid under pressure into cylinder 27 upon one side of piston 26 and connect the portion of the cylinder 27 upon the other side of piston 26 with the outlet connection 40. As a result, the cylinder 27 and lever 13 will be moved bodily until the pivotal mounting 50 of the bell crank lever is brought into a perdetermined normal relationship with respect to the lever 22. During such motion, the desired steering is accomplished and the ports of the valve are gradually closed.

Figure 4:
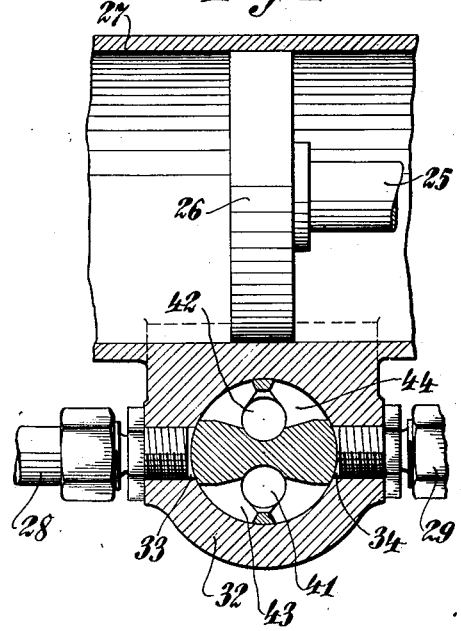
Figure 4 is a view in section, taken on line 4—4 of Figure 3, and looking in the direction of the arrows.
Figure 5:
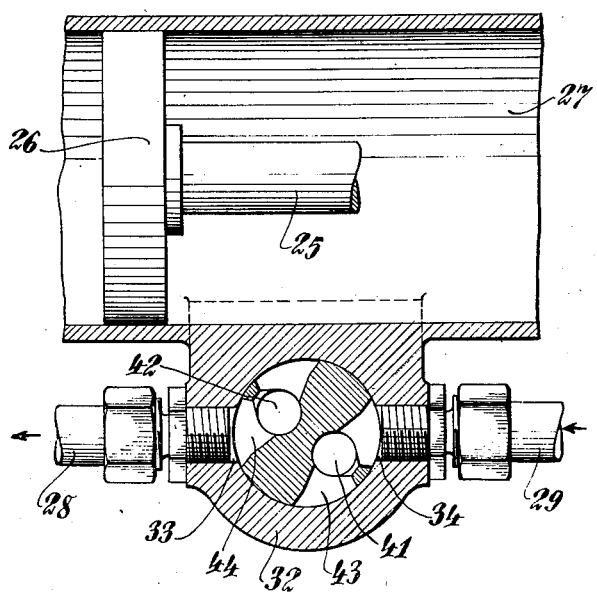
Figure 5 is a view similar to Figure 4, showing the mechanism in a condition incident to a phase of actuation thereof.

An illustration of the operation of the mechanism is as follows:

Assume that the steering wheel 18 is turned to move the lever 22 to the left (clockwise) as viewed in Figure 1, the neutral position of the mechanism being shown in solid lines in Figure 1. This moves lever 47 downwardly into the position indicated by the dot and dash lines in Figure 1 and rotates the valve plate 45 in a counterclockwise direction to cause the conduit 28 to communicate with pipe 40 through passage 44 and port 42, as seen in Figure 5. Conduit 29 communicates with conduit 39 through passage 43 and port 41. This causes fluid to be introduced into the cylinder 27 upon the left hand side of piston 26 and thus the cylinder 27 is moved to the left as viewed in Figure 1. This movement swings lever 13 to the left to cause a corresponding motion of the steering mechanism. As lever 13 swings to the left, lever 22 is relatively fixed (assuming that the wheel 18 is held stationary) and the lever 47 (as explained hereinafter) is rocked about 50 and moved upwardly to restore the valve plate 45 to a position in which the supply conduit 39 does not communicate with either side of the piston as shown in Figure 4.

From the foregoing, it will be observed that lever 47, 48 is a rocking lever which is journaled about the pin 50 on lever 13. The rocking member formed by the arms 47 and 48 thus may partake of rocking movement upon lever 13 and is connected through a pin and slot connection to the manually operated lever 22 which may be termed the control lever. The pin and slot connection 22' between the control lever and the rocking member is necessarily spaced at a different distance from the axis of shaft 21 than the distance which pin 50 is spaced from such axis. In this fashion, by forming the axis of the slot and pin connection to form an angle to a line perpendicular to the line passing between the axis of the journal connection of the rocking member on the first lever and the axis of the pin of the last named pin and slot connection, motion of the control lever 22 with respect to the lever 13 will cause the rocking member 47 and 48 to be rocked about the axis 50. The rocking member is also connected to an arm on the valve plate 45 by a pin and slot connection in such fashion that the axis of the slot of such connection is so positioned that rocking motion of the rocking member causes the valve to rock. In this fashion, when the control lever 22 is moved to cause the servomotor to actuate the arm 13, the valve plate 45 which is immediately moved in accordance with the motion of the lever 22 is moved in the opposite direction upon actuation of the servomotor to restore the valve mechanism to its neutral or closed position. In this manner, it will be seen that the lever 47 moves downwardly when the lever 13 moves to the right because the axes of pins 49 and 50 are differently spaced from the axis of shaft 21 and because the slot 22' is shown positioned as to constrain movement of the pin 49 to motion axially of the lever 22, the rocking member 48 and 49 oscillates about the axis of pin 50 to accommodate such motion. In this operation, the wall of the slot acts as a cam on the pin.

It will be seen, from the foregoing, that a simple and effective mechanism has been provided for utilizing a source of fluid pressure to effect the steering of a motor vehicle, the controlling mechanism, therefore, being of such nature as to be actuated by the manual steering mechanism commonly provided upon motor vehicles.

While the invention has been described with specific reference to the construction shown in the accompanying drawings, it is not to be limited save as defined in the appended claim.

I claim as my invention:—

A servomotor mechanism comprising a rotatable shaft, a lever journaled at one end on the shaft and connected at the other end to the motor mechanism, a piston and cylinder pivotally connected between the lever intermediate the ends thereof and a relatively stationary element, a source of fluid pressure, a valve to introduce the fluid pressure into the cylinder, a control lever secured at one end to the shaft, an arm on the valve, a rocking member journaled for rocking movement on the first lever intermediate the ends thereof and having a portion lying adjacent the arm on the valve, means connecting the adjacent portion of the rocking member and the arm on the valve, the rocking member also having a portion adjacent a portion of the control lever, a pin and slot connection between the control lever and the adjacent portion of the rocking member, the journal connection of the rocking member on the first lever lying at a different distance from the axis of the rotatable shaft than the distance of the axis of the pin and slot connection therefrom, the axis of the slot of the last named connection forming an angle with a line perpendicular to a line passing between the axis of the journal connection of the rocking member on the first lever and the axis of the pin of the pin and slot connection, and the lines between the axis of the journal connection of the rocking member on the first lever and the respective pin and slot connections to said rocking member lying at angles to one another.

WALTER S. DAVIDSON.

Patent No. 1,991,597                           Granted February 19, 1935

WALTER S. DAVIDSON

The above entitled patent was extended October 2, 1951, under the provisions of the Act of June 30, 1950, for 2 years and 287 days from the expiration of the original term thereof.

*Commissioner of Patents.*